US007911593B2

(12) United States Patent
Ueno

(10) Patent No.: US 7,911,593 B2
(45) Date of Patent: Mar. 22, 2011

(54) RANGE FINDER/VELOCIMETER AND RANGE-FINDING/VELOCIMETRY METHOD

(75) Inventor: Tatsuya Ueno, Tokyo (JP)

(73) Assignee: Yamatake Corporation, Tokyo (JP)

( * ) Notice: Subject to any disclaimer, the term of this patent is extended or adjusted under 35 U.S.C. 154(b) by 594 days.

(21) Appl. No.: 11/919,649

(22) PCT Filed: Apr. 20, 2006

(86) PCT No.: PCT/JP2006/308304
§ 371 (c)(1),
(2), (4) Date: Oct. 29, 2007

(87) PCT Pub. No.: WO2006/120857
PCT Pub. Date: Nov. 16, 2006

(65) Prior Publication Data
US 2009/0279070 A1  Nov. 12, 2009

(30) Foreign Application Priority Data
May 6, 2005   (JP) ................................ 2005-134980

(51) Int. Cl.
*G01P 3/36* (2006.01)

(52) U.S. Cl. ........ 356/28.5; 356/4.1; 356/5.1; 356/5.15; 356/28

(58) Field of Classification Search ................... 356/28.5
See application file for complete search history.

(56) References Cited

U.S. PATENT DOCUMENTS

| | | | |
|---|---|---|---|
| 4,895,441 A * | 1/1990 | Allen, Jr. ...................... | 356/5.09 |
| 2001/0032514 A1 | 10/2001 | Maruyama | |
| 2004/0252047 A1 | 12/2004 | Miyake et al. | |
| 2007/0058157 A1 * | 3/2007 | Deines ............................ | 356/28 |

FOREIGN PATENT DOCUMENTS

| | | | |
|---|---|---|---|
| JP | 02-071187 A | | 3/1990 |
| JP | 02071187 | * | 3/1990 |

(Continued)

OTHER PUBLICATIONS

Ueda et al., "Range Finder Using Self-Coupling Effect of Semiconductor Laser", 1994 Tokai-Section Joint Convention Record of the Six Institutes of Electrical and Related Engineers.
Yamada et al., "Study of Compact Distance Meter by Self-Coupled Effect of Laser Diode", Bulletin of Aichi Institute of Technology, vol. 31 B pp. 35-42, 1996.

(Continued)

*Primary Examiner* — Thomas H Tarcza
*Assistant Examiner* — Luke D Ratcliffe
(74) *Attorney, Agent, or Firm* — Blakely, Sokoloff, Taylor & Zafman LLP

(57) ABSTRACT

A laser driver (4) causes a semiconductor laser (1) to operate such that a first oscillation period of monotonically increasing the oscillation wavelength and a second oscillation period of monotonically decreasing the oscillation wavelength alternately exist. A photodiode (2) converts laser light emitted from the semiconductor laser (1) and return light from a measurement target (12) into electrical signals. A counting unit (13) counts the number of interference waveform components obtained from an output signal from the photodiode (2) in each of the first oscillation period and the second oscillation period. A computing device (9) calculates the distance to the measurement target (12) and the velocity of the measurement target (12) from a shortest Lasing wavelength and a longest Lasing wavelength in a period during which the counting unit (13) counts the number of interference waveform components and the counting result obtained by the counting unit (13). This makes it possible to measure the distance to the moving measurement target (12) and the velocity of the measurement target (12).

15 Claims, 13 Drawing Sheets

FOREIGN PATENT DOCUMENTS

JP  2001-255202  *  9/2001
JP  2001-255202 A    9/2001

OTHER PUBLICATIONS

Giuliani et al., "Laser diode self-mixing technique for sensing applications", Journal of Optics A: Pure and Applied Optics, pp. 283-294, 2002.

Ichioka, Y. et al., Search of a Moving Object and Its Range-Image Measurement Using Range-Finding Speedometer, Conference Record of the 1996 IEEE Industry Applications Conference-31st IAS Annual Meeting, vol. 3, Oct. 6, 1996.

Tsukuda, N. et al., New Range-Finding Speedometer Using a Self-Mixng Laser Diode Modulated by Triangular Wave Pulse Current, Instrumentation and Measurement Technology Conference, pp. 332-335, May 10, 1994.

* cited by examiner

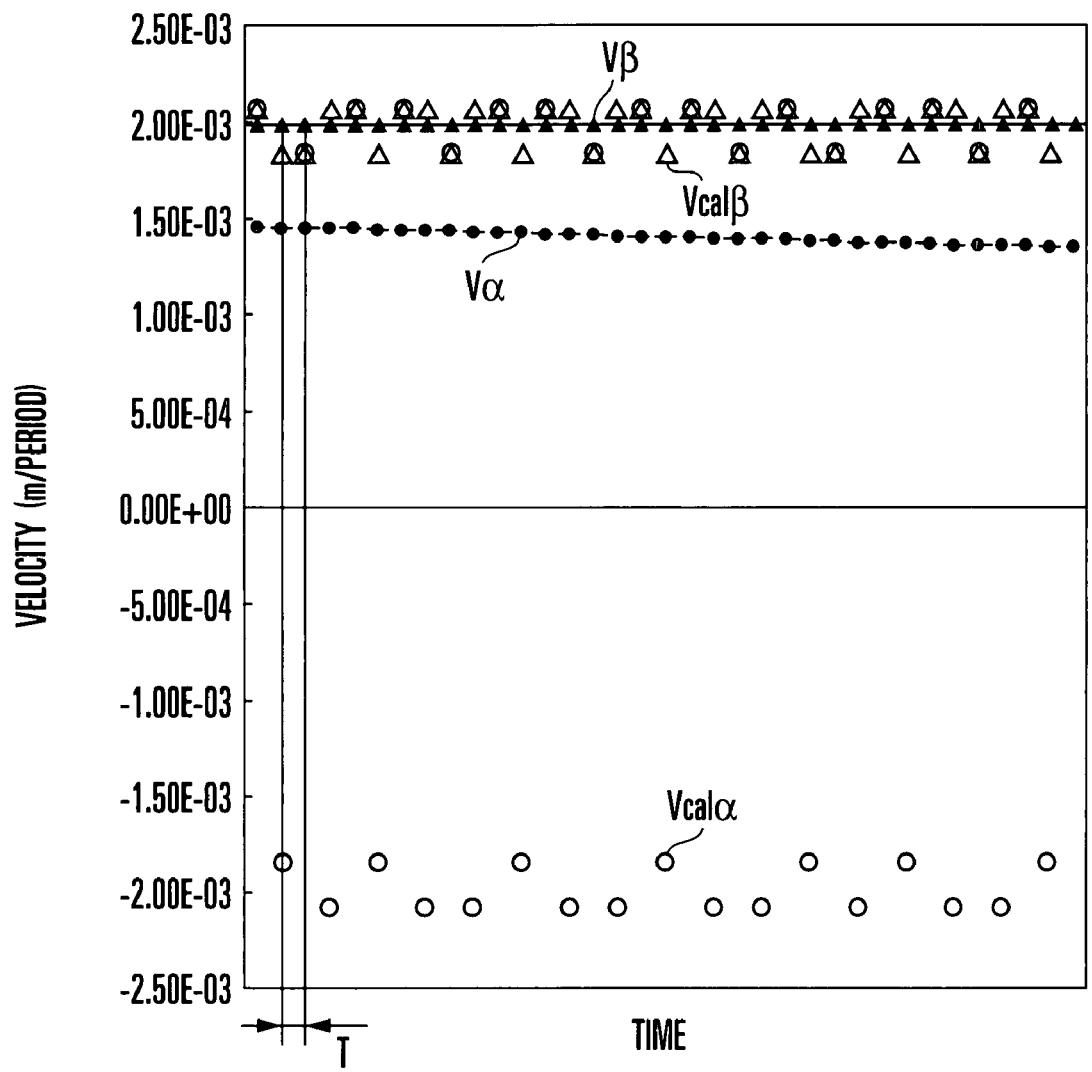
F I G. 8

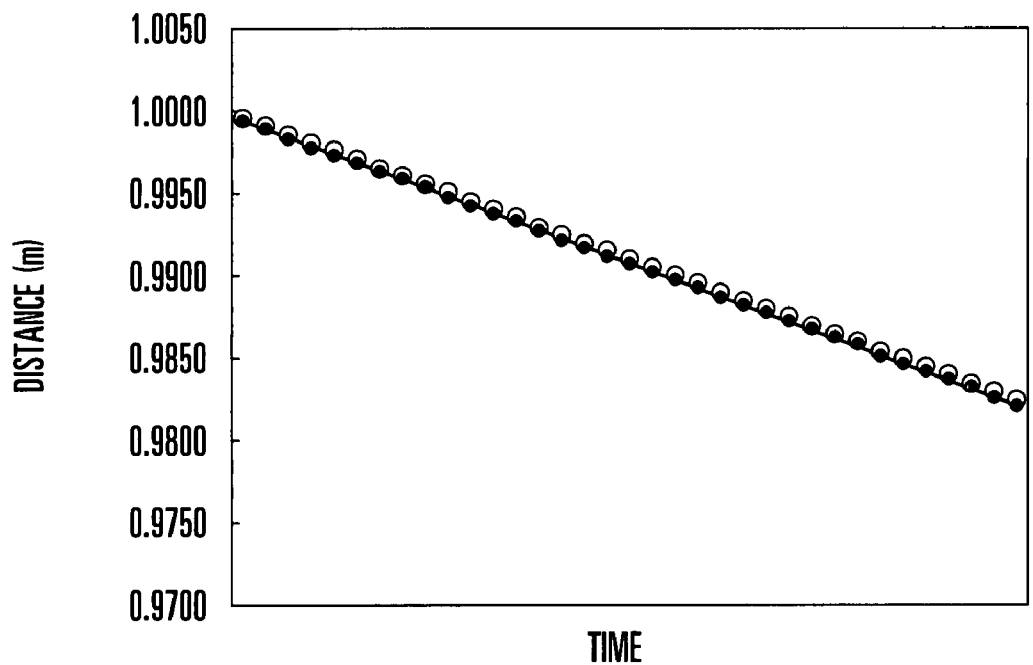
F I G. 13
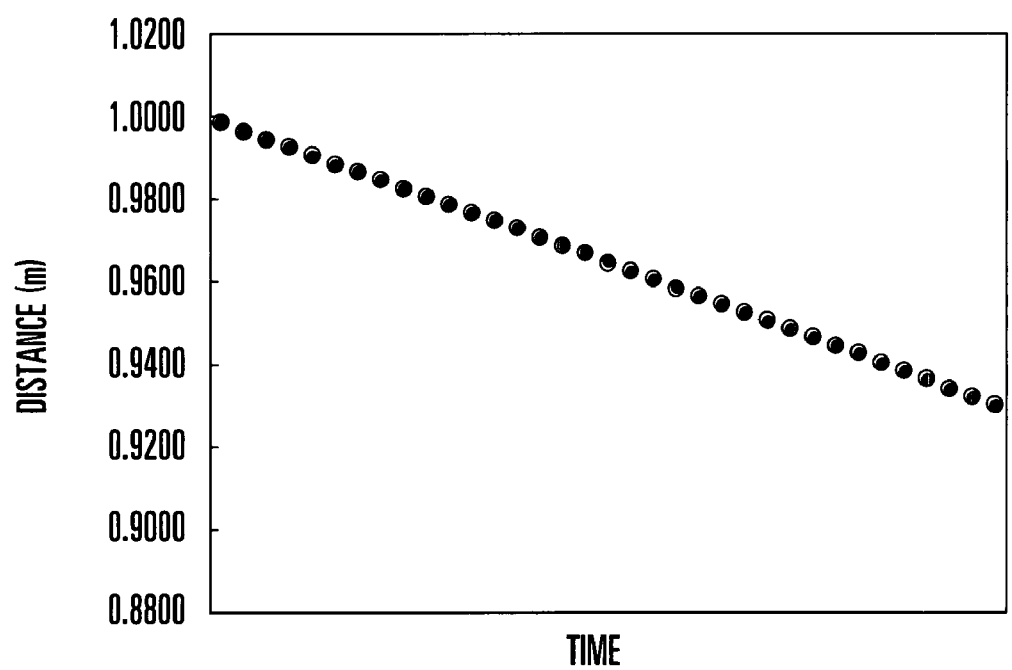
F I G. 14

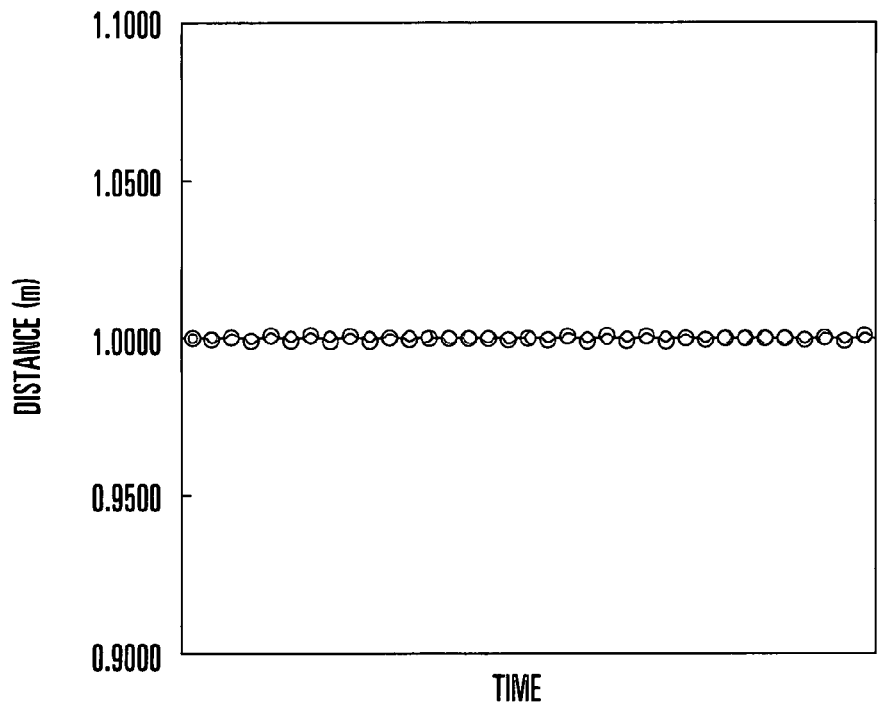
F I G. 16
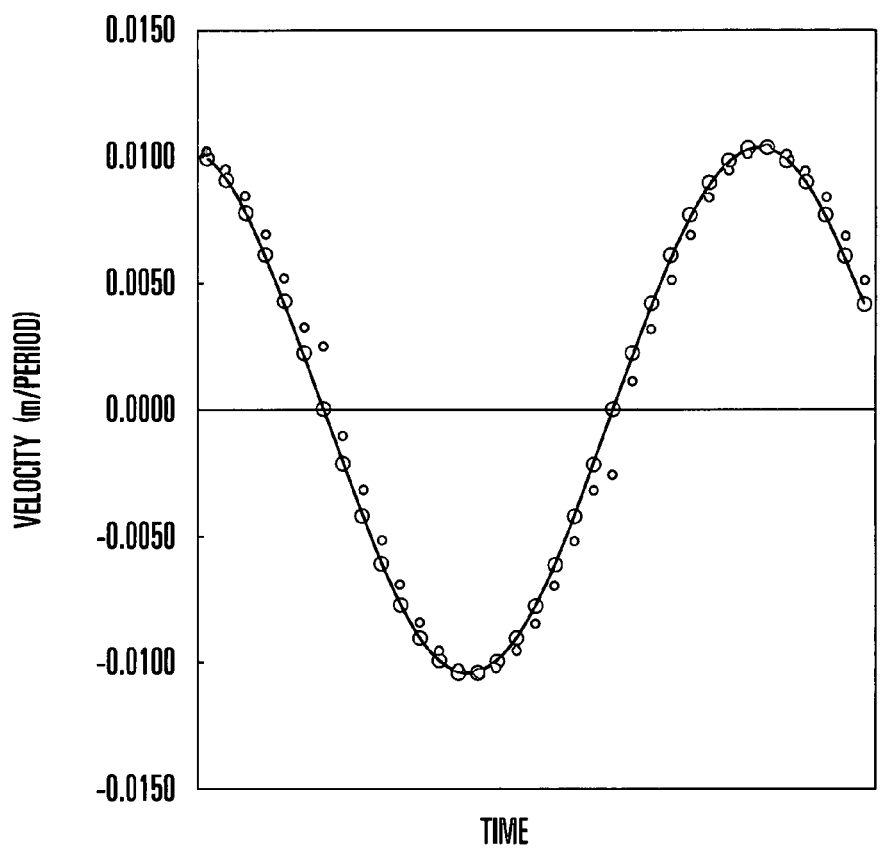
F I G. 17

RANGE FINDER/VELOCIMETER AND RANGE-FINDING/VELOCIMETRY METHOD

The present patent application is a non-provisional application of International Application No. PCT/JP2006/308304, filed Apr. 20, 2006.

TECHNICAL FIELD

The present invention relates to a range finder/velocimeter and a range-finding/velocimetry method which measure the distance to a measurement target and the velocity of the measurement target by using a wavelength-modulated wave.

BACKGROUND ART

Range-finding using light interference caused by a laser has long been used as a high-precision measurement method which does not disturb a measurement target because of non-contact measurement. Attempts have recently been made to use a semiconductor laser as an optical measurement light source in order to miniaturize an apparatus. A typical example uses an FM heterodyne interferometer. This apparatus can measure relatively long distances and has high precision. However, the apparatus uses an interferometer outside a semiconductor laser, and hence requires a complicated optical system.

There has also been proposed a measurement instrument using the interference (self-mixing effect/self-coupling effect) between output light from a laser and return light from a measurement target in a semiconductor laser. Such self-mixing/self-coupling type laser measurement instruments are disclosed in, for example, reference 1 (Tadashi Ueda, Jun Yamada, and Susumu Shito, "Range Finder Using Self-Coupling Effect of Semiconductor Laser", 1994 TOKAI-SECTION JOINT CONVENTION RECORD OF THE SIX INSTITUTES OF ELECTRICAL AND RELATED ENGINEERS), Reference 2 (Jun Yamada, Susumu Shito, Norio Tsuda, and Tadashi Ueda, "Study of Compact Distance Meter by Self-Coupled Effect of Laser Diode", Bulletin of Aichi Institute of Technology, Vol. 31 B pp. 35-42, 1996), and reference 3 (Guido Giuliani, Michele Norgia, Silvano Donati and Thierry Bosch, "Laser diode self-mixing technique for sensing applications", JOURNAL OF OPTICS A: PURE AND APPLIED OPTICS, pp. 283-294, 2002).

According to a self-mixing/self-coupling type laser measurement instrument, since a semiconductor laser built in a photodiode has a combination of light-emitting, interference, and light-receiving functions, an external interference optical system can be greatly simplified. Therefore, a sensor unit comprises only a semiconductor laser and a lens, resulting in a reduction in size as compared with the prior art. In addition, a characteristic of this technique is that it has a range-finding range wider than that of the triangulation method.

FIG. 20 shows a complex resonator model of an FP type (Fabry-Perot type) semiconductor laser. Referring to FIG. 20, reference numeral 101 denotes semiconductor laser resonator; 102, a cleavage surface of a semiconductor crystal; 103, a photodiode; and 104, a measurement target. Part of reflected light from the measurement target 104 tends to return into the oscillation region. The small amount of light which has returned mixes with laser light inside the resonator 101. This makes the resonator operate unstably and causes noise (complex resonator noise or return light noise). Even return light of a very small amount relative to output light causes a noticeable change in the characteristics of the semiconductor laser. Such a phenomenon occurs not only in a Fabry-Perot type (to be referred to as an FP type hereinafter) semiconductor laser but also in other types of semiconductor lasers such as a vertical cavity surface emitting type semiconductor laser (to be referred to as a VCSEL) and a distributed feedback type semiconductor laser (to be referred to as a DFB laser).

Letting λ be the oscillation wavelength of the laser and L be the distance from the cleavage surface 102 near the measurement target 104 to the measurement target 104, when the following resonance condition is satisfied, return light and laser light inside the resonator 101 intensify each other to slightly increase the laser output:

$$L=n\lambda/2 \qquad (1)$$

where n is an integer. It is possible to satisfactorily observe this phenomenon, even if scattered light from the measurement target 104 is very weak, because the apparent reflectance in the resonator 101 of the semiconductor laser increases to produce an amplifying effect.

A semiconductor laser emits laser beams having different frequencies in accordance with the magnitude of an injection current, and hence allows to perform direct modulation of the oscillation frequency using an injection current without requiring any external modulator. FIG. 21 is a graph showing the relationship between the oscillation wavelength of the semiconductor laser and the output waveform of the photodiode 103 when the oscillation wavelength changes at a given constant rate. When $L=n\lambda/2$ indicated by equation (1) is satisfied, the phase difference between return light and laser light inside the resonator 101 is 0° (in phase), and the return light and the laser light inside the resonator 101 intensify each other most. When $L=n\lambda/2+\lambda/4$, the phase difference becomes 180° (in opposite phase), the return light and the laser light inside the resonator 101 weaken each other most. For this reason, as the oscillation wavelength of the semiconductor laser changes, the intensity of the laser output alternately and repeatedly increases and decreases. Detecting the laser output at this time by using the photodiode 103 provided for the resonator 101 will obtain a stepwise waveform with a predetermined period as shown in FIG. 21. Such a waveform is generally called an interference fringe.

Each one of the stepwise waveform components, i.e., the interference fringe components, is called a mode hop pulse (to be referred to as an MHP hereinafter). MHP is a phenomenon different from the mode hopping phenomenon to be described later. Assume that the distance to the measurement target 104 is represented by L1 and the number of MHPs is 10. In this case, when the distance decreases to a distance L2 which is half of the distance L2, the number of MHPs becomes five. That is, when the oscillation wavelength of the semiconductor laser is changed in a predetermined time period, the number of MHPs changes in proportion to the measurement distance. Therefore, detecting MHPs by using the photodiode 103 and measuring the frequency of the MHPs can easily measure the distance. Note that the mode hopping phenomenon unique to an FP type semiconductor laser is a phenomenon in which an oscillation wavelength has discontinuous portions in accordance with a continuous increase/decrease in injection current. When the injection current increases and decreases, the oscillation wavelength exhibits slight hystereses.

DISCLOSURE OF INVENTION

Problem to be Solved by the Invention

As described above, a self-mixing/self-coupling type laser measurement instrument can greatly simplify the interference optical system outside the resonator, and hence can achieve a reduction in the size of the apparatus. In addition, this instrument requires no high-speed circuit and is robust against disturbance light. Furthermore, since return light from a measurement target is allowed to be very weak, the instrument is not influenced by the reflectance of the measurement target. That is, the instrument can be applied to any type of measurement target.

Conventional interference type measurement instrument including self-mixing/self-coupling type instruments, however, cannot measure the distance to a moving measurement target and its velocity even though it can measure the distance to a stationary measurement target.

The present invention has been made to solve the above problem, and has as its object to measure the distance to a moving measurement target and its velocity as well as the distance to a stationary measurement target.

Means of Solution to the Problem

A range finder/velocimeter of the present invention is characterized by comprising a semiconductor laser which emits laser light to a measurement target, a laser driver which causes the semiconductor laser to operate such that a first oscillation period including at least a period of continuously and monotonically increasing an oscillation wavelength and a second oscillation period including at least a period of continuously and monotonically decreasing the oscillation wavelength alternately exist for at least two periods, a light-receiving device which converts laser light emitted from the semiconductor laser and return light from the measurement target into electrical signals, counting means for counting the number of interference waveform components caused by laser light emitted from the semiconductor laser and return light from the measurement target which are contained in an output signal from the light-receiving device in at least part of each of the first oscillation period and the second oscillation period, and computing means for calculating a distance to the measurement target and a velocity of the measurement target from a shortest Lasing wavelength and a longest Lasing wavelength in a period during which the number of interference waveform components is counted by the counting means and a counting result obtained by the counting means.

A range-finding/velocimetry method of the present invention is characterized by comprising the steps of applying a wavelength-modulated wave to a measurement target, detecting interference caused between the applied wave and a return wave reflected by the measurement target, and calculating a distance to the measurement target and a velocity of the measurement target on the basis of information associated with the detected interference.

Effects of the Invention

According to the present invention, it is possible to measure not only the distance to a stationary measurement target but also the distance to a moving measurement target and its velocity (speed, direction). In addition, according to the present invention, it is possible to determine, from the minimum and longest Lasing wavelengths of the semiconductor laser and the counting result obtained by the counting means, whether the measurement target is in uniform motion or accelerated motion.

BRIEF DESCRIPTION OF DRAWINGS

FIG. 8 is a graph showing an example of velocity candidate values and distance subtractions when the measurement target is moving (in uniform motion) in a normal displacement region in the embodiment of the present invention;

FIG. 13 is a graph showing distances measured when the measurement target is moving (in uniform motion) in the micro displacement region and the true values of the distances in the embodiment of the present invention;

FIG. 14 is a graph showing distances measured when the measurement target is moving (in uniform motion) in the normal displacement region and the true values of the distances in the embodiment of the present invention;

FIG. 16 is a graph showing distances measured when the measurement target is vibrating (in accelerated motion) in the micro displacement region, the average values of the distances, and the true values of the distances in the embodiment of the present invention;

FIG. 17 is a graph showing velocities measured when the measurement target is vibrating (in accelerated motion) in the normal displacement region and the true values of the velocities in the embodiment of the present invention;

BEST MODE FOR CARRYING OUT THE INVENTION

The present invention is a technique for simultaneously calculating the distance to a target and its velocity on the basis of an interference signal based on a wave output in sensing operation using wavelength modulation and a wave reflected by the target. The present invention can therefore be applied to optical interferometers other than self-mixing/self-coupling type interferometers and interferometers other than optical interferometers. More specifically, in the case of the use of the self-mixing/self-coupling of a semiconductor laser, as the oscillation wavelength of the semiconductor laser is changed while laser light is applied from the laser to a measurement target, the displacement of the measurement target during a period in which the oscillation wavelength changes from the shortest Lasing wavelength to the longest Lasing wavelength (or a period during which the oscillation wavelength changes from the longest Lasing wavelength to the shortest Lasing wavelength) is reflected in the number of MHPs. Therefore, checking the number of MHPs when the oscillation wavelength is changed makes it possible to detect the state of the measurement target. The above is the basic principle of the present invention.

Figure 1:
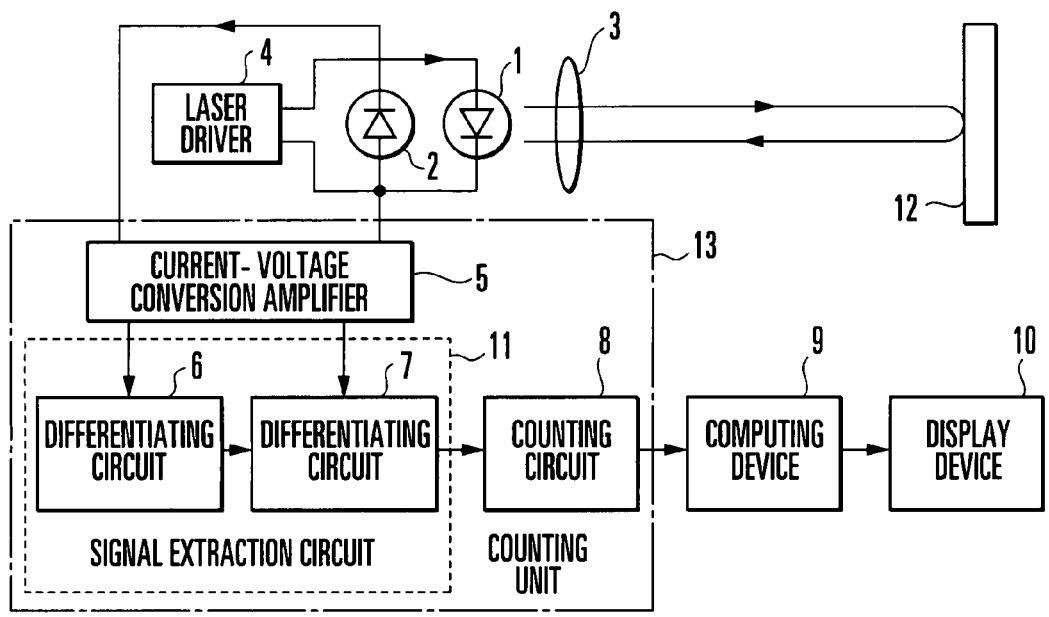
FIG. 1 is a block diagram showing the arrangement of a range finder/velocimeter according to an embodiment of the present invention.

An embodiment of the present invention will be described with reference to the accompanying drawings. FIG. 1 is a block diagram showing the arrangement of a range finder/velocimeter according to the embodiment of the present invention. The range finder/velocimeter in FIG. 1 includes a semiconductor laser 1 which emits laser light to a measurement target 12, a photodiode (light-receiving device) 2 which converts a light output from the semiconductor laser 1 into an electrical signal, a lens 3 which condenses light from the semiconductor laser 1 and applies it to the measurement target 12 while condensing return light from the measurement target 12 and applying it to the semiconductor laser 1, a laser driver 4 which causes the semiconductor laser 1 to alternately repeat a first oscillation period of continuously increasing the oscillation wavelength and a second oscillation period of continuously decreasing the oscillation wavelength, a counting unit 13 which counts the number of interference waveform components due to a self-mixing effect/self-coupling effect produced in the semiconductor laser 1, which are contained in an output signal from the photodiode 2, in each of the first and second oscillation periods, a computing device 9 which calculates the distance to the measurement target 12 and the velocity of the measurement target 12, and a display device 10 which displays the calculation result obtained by the computing device 9. The counting unit 13 comprises a current-voltage conversion amplifier 5 which converts an output current from the photodiode 2 into a voltage and amplifies it, a signal extraction circuit 11 which performs second-order differential of an output voltage from the current-voltage conversion amplifier 5 and a counting circuit 8 which counts the number of MHPs contained in an output voltage from the signal extraction circuit 11.

For the sake of descriptive convenience, assume that in the following description, as the semiconductor laser 1, a laser of a type (VCSEL type or DFB laser type) which does not exhibit the above mode hopping phenomenon is used. When a laser of a type (FP type) which exhibits the mode hopping phenomenon is used as the semiconductor laser 1, the use of it will be specially noted.

Figure 2:
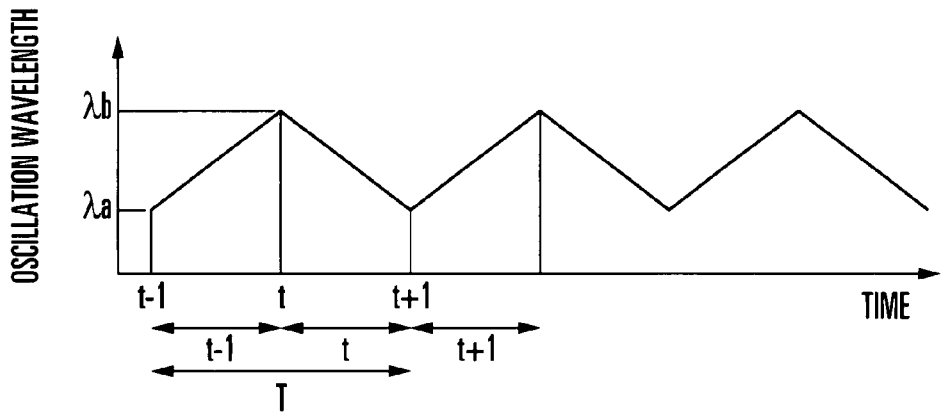
FIG. 2 is a graph showing an example of a temporal change in the oscillation wavelength of a semiconductor laser in the embodiment of the present invention.

For example, the laser driver 4 supplies a triangular drive current, which repeatedly increases and decreases at a predetermined change rate with respect to the time, as an injection current, to the semiconductor laser 1. This makes the semiconductor laser 1 alternately repeat the first oscillation period of continuously increasing the oscillation wavelength at a predetermined change rate in proportion to the magnitude of an injection current and the second oscillation period of continuously decreasing the oscillation wavelength at a predetermined change rate. FIG. 2 is a graph showing a temporal change in the oscillation wavelength of the semiconductor laser 1. Let t−1 be the (t−1)th oscillation period, t be the tth oscillation period, $\lambda a$ be the minimum value of the oscillation wavelength in each period, and $\lambda b$ be the maximum value of the oscillation wavelength in each period. In this embodiment, the maximum value $\lambda b$ of the oscillation wavelength and the minimum value $\lambda b$ of the oscillation wavelength are always made constant, and a difference $\lambda b - \lambda a$ between them is also always made constant.

Figure 3:
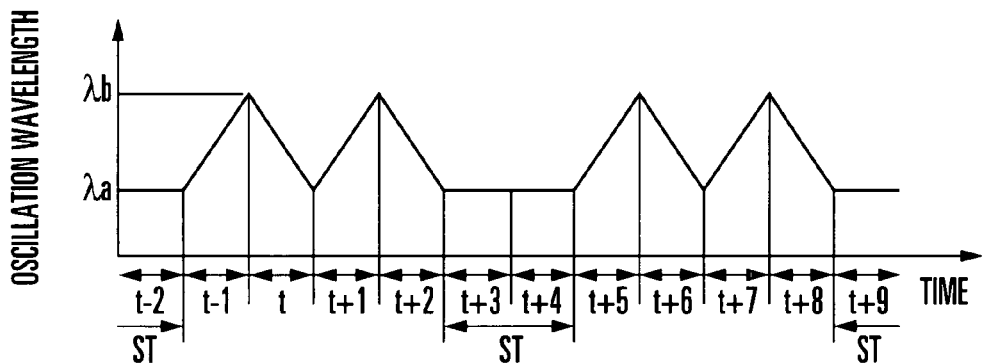
FIG. 3 is a graph showing another example of the temporal change in the oscillation wavelength of the semiconductor laser in the embodiment of the present invention.

The laser driver 4 causes the semiconductor laser 1 to operate such that the first and second oscillation periods alternately exist for at least two periods each. If each oscillation period exists for two or more periods, it is possible to detect the distance to the measurement target 12 in uniform motion and its velocity. If each oscillation period exists for three or more periods, it is possible to detect the distance to the measurement target 12 in accelerated motion and its velocity. Note that in order to discriminate uniform motion from accelerated motion, three periods or more are required. In addition, it is possible to use any waveform (e.g., a sine wave) other than that of the above triangular wave as long as it includes a period during which the oscillation wavelength continuously and monotonically increases in the first oscillation and a period during which the oscillation wavelength continuously and monotonically decreases in the second oscillation. For example, as shown in FIG. 3, it is possible to use an intermittent waveform having a rest period ST for every two peaks (i.e., every four periods) in order to suppress the current consumption.

Figure 4A:
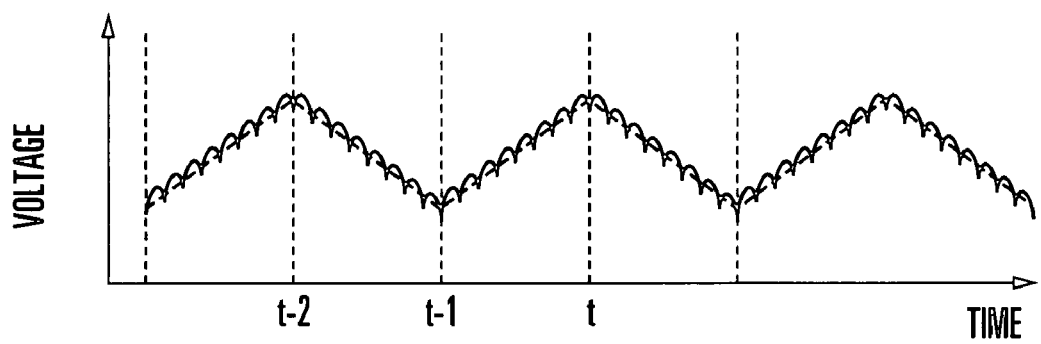
FIGS. 4A to 4C are graphs each schematically showing the output voltage waveform of a current-voltage conversion amplifier and the output voltage waveform of a differentiating circuit in the embodiment of the present invention.
Figure 4B:
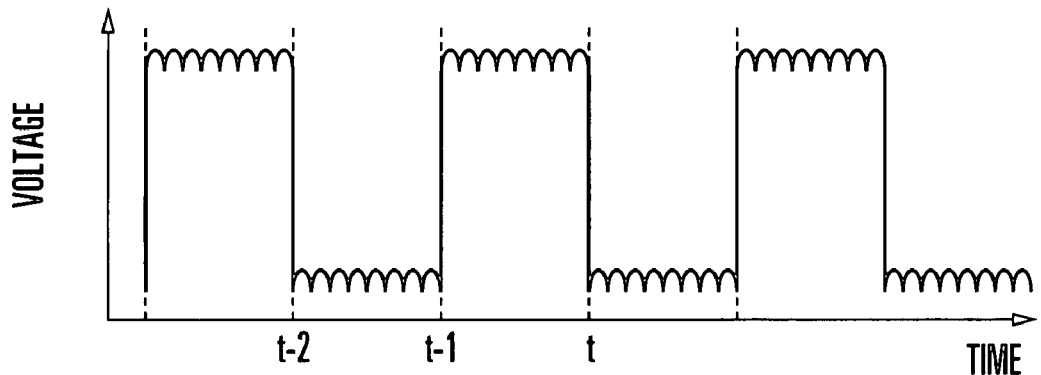
Figure 4C:
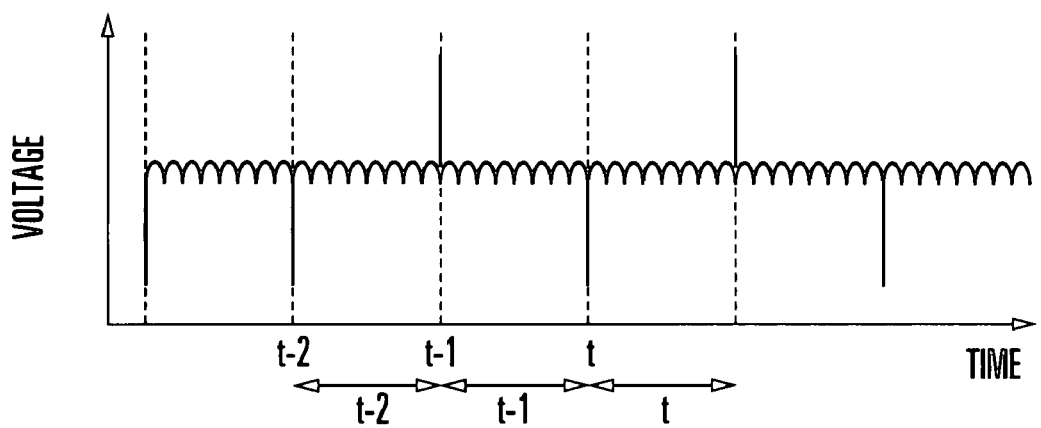

Laser light emitted from the semiconductor laser 1 is condensed by the lens 3 and strikes the measurement target 12. The light reflected by the measurement target 12 is condensed by the lens 3 and strikes the semiconductor laser 1. Note that condensing light by the lens 3 is not essential. The photodiode 2 converts a light output from the semiconductor laser 1 into a current. The current-voltage conversion amplifier 5 converts an output current from the photodiode 2 into a voltage and amplifies it. The signal extraction circuit 11 has a function of extracting a superimposed signal from a modulated wave. This circuit comprises, for example, two differentiating circuits 6 and 7. The differentiating circuit 6 differentiates an output voltage from the current-voltage conversion amplifier 5. The differentiating circuit 7 differentiates an output voltage from the differentiating circuit 6. FIG. 4A is a graph for schematically showing an output voltage waveform from the current-voltage conversion amplifier 5. FIG. 4B is a graph schematically showing an output voltage waveform from the differentiating circuit 6. FIG. 4C is a graph schematically showing an output voltage waveform from the differentiating circuit 7. These graphs show the process of extracting the MHP waveform (superimposed wave) in FIG. 4C by removing the oscillation waveform (carrier wave) of the semiconductor laser 1 in FIG. 2 from the waveform (modulated wave) in FIG. 4A which is an output from the photodiode 103.

The counting circuit 8 counts the number of MHPs contained in an output voltage from the differentiating circuit 7 in each of the first oscillation period t−1 and the second oscillation period t. Assume that in the following description, the number of MHPs in the first oscillation period t−1 is represented by MHPt−1 ("t−1" is a suffix of the variable MHP; ditto for the following), and the number of MHPs in the second oscillation period is represented by MHPt. As the counting circuit 8, a counter comprising logic gates may be used. If a drive current having a waveform which repeatedly increases and decreases at a predetermined change rate is used to operate the semiconductor laser, the frequency of MHPs (i.e., the number of MHPs per unit time) may be measured by using Fast Fourier Transform (to be referred to as FFT hereinafter).

The computing device 9 calculates the distance to the measurement target 12 and the velocity of the measurement target 12 on the basis of the shortest Lasing wavelength λa and the longest Lasing wavelength λb of the semiconductor laser 1, the number MHPt−1 of MHPs in the oscillation period t−1, and the number MHPt of MHPs in the oscillation period t. As described above, the semiconductor laser 1 is operated such that the difference λb−λa between the longest Lasing wavelength λb and the shortest Lasing wavelength λa is always constant. If, however, the semiconductor laser 1 is to be operated such that the difference λb−λa is not necessarily constant, the number of MHPs needs to be normalized by the difference λb−λa in a target period before the calculation of the velocity.

Figure 5:
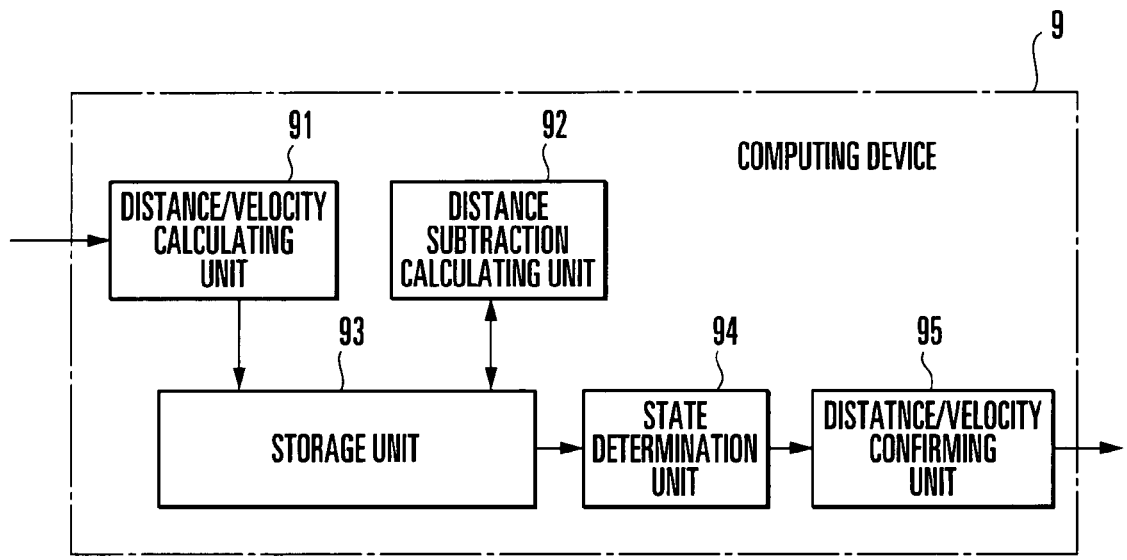
FIG. 5 is a block diagram showing an example of the arrangement of a computing device in the embodiment of the present invention.
Figure 6:
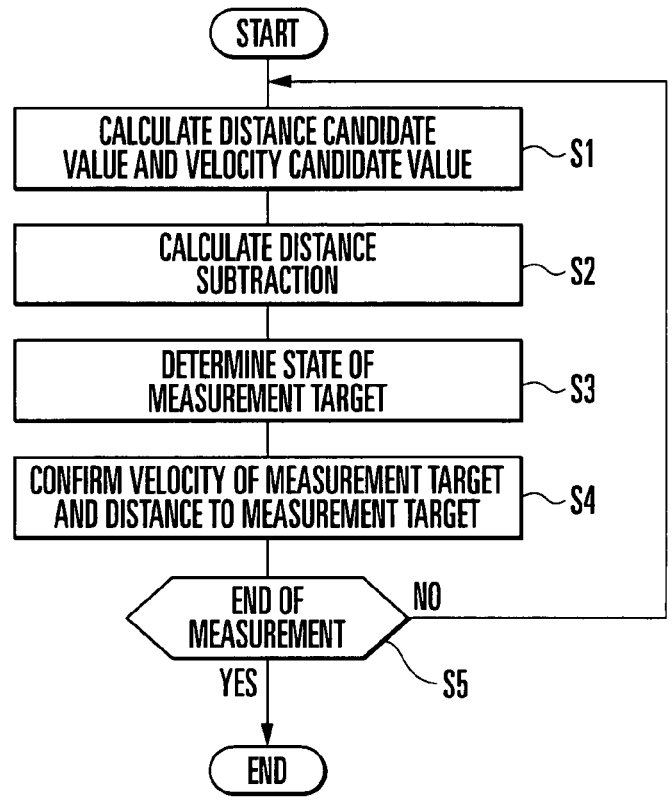
FIG. 6 is a flowchart showing the operation of the computing device in the embodiment of the present invention.

FIG. 5 is a block diagram showing an example of the arrangement of the computing device 9. FIG. 6 is a flowchart showing the operation of the computing device 9. The computing device 9 comprises a distance/velocity calculating unit 91 which calculates a candidate value of the distance to the measurement target 12 and a candidate value of the velocity of the measurement target 12 on the basis of the shortest Lasing wavelength λa and the longest Lasing wavelength λb of the semiconductor laser 1, the number MHPt−1 of MHPs in the first oscillation period t−1, and the number MHPt of MHPs in the second oscillation period t, a distance subtraction calculating unit 92 which calculates a distance subtraction as the difference between a distance candidate value calculated by the distance/velocity calculating unit 91 and a distance candidate value calculated one period before, a storage unit 93 which stores the calculation results obtained by the distance/velocity calculating unit 91 and the distance subtraction calculating unit 92, a state determination unit 94 which determines the state of the measurement target 12 on the basis of the calculation results obtained by the distance/velocity calculating unit 91 and the distance subtraction calculating unit 92, and a distance/velocity confirming unit 95 which confirms the distance to the measurement target 12 and the velocity of the measurement target 12 on the basis of the determination result obtained by the state determination unit 94.

Assume that in this case, the start point of the period t is time t. Assume also that the state of the measurement target 12 is either a micro displacement region indicating a movement smaller than a predetermined reference or a normal displacement region larger than the reference. Letting V be the average displacement of the measurement target 12 per period between the oscillation period t−1 and the oscillation period t, the micro displacement region is a state which satisfies (λb−λa)/λb>V/Lb (where Lb is the distance at time t), and the normal displacement region is a state which satisfies (λb−λa)/λb=V/Lb. Note that the velocity of the measurement target 12 can be obtained by normalizing a displacement V with the total time of the period t−1 and the period t.

First of all, the distance/velocity calculating unit 91 of the computing device 9 calculates distance candidate values La(t) and Lβ(t) at current time t and velocity candidate values Va(t) and Vβ(t) according to the following equations, and stores the calculated values in the storage unit 93 (step S1 in FIG. 6):

$$La(t)=\lambda a \times \lambda b \times (\text{'}MHPt-1\text{'}+\text{'}MHPt\text{'})/\{4\times(\lambda b-\lambda a)\} \quad (2)$$

$$L\beta(t)=\lambda a \times \lambda b \times (|\text{'}MHPt-1\text{'}-\text{'}MHPt\text{'}|)/\{4\times(\lambda b-\lambda a)\} \quad (3)$$

$$Va(t)=(\text{'}MHPt-1\text{'}-\text{'}MHPt\text{'})\times \lambda/4 \quad (4)$$

$$V\beta(t)=(\text{'}MHPt-1\text{'}+\text{'}MHPt\text{'})\times \lambda/4 \quad (5)$$

Note that the quotation marks "'" in these equations are added to discriminate the suffixes of "MHP" from operators (ditto for the following). In equations (4) and (5), λ represents a wavelength at time t−1 one period before the current time t. For example, in the case shown in FIG. 2, the wavelength λ is λa. In addition, if the current time is time t+1 in FIG. 2, the wavelength λ is λb.

Figure 22:
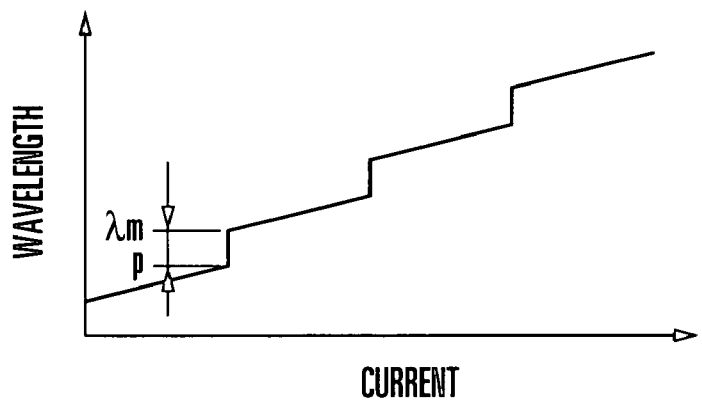
FIG. 22 is a graph showing the magnitude of the width of frequencies made discontinuous by the mode hopping phenomenon.

Note that equations (2) and (3) given above are based on the assumption that a laser without any mode hopping phenomenon is used as the semiconductor laser 1. If a laser with the mode hopping phenomenon is to be used as the semiconductor laser 1, equations (2A) and (3A) given below need to be used in place of equations (2) and (3) given above:

$$La(t)=\lambda a \times \lambda b \times (\text{'}MHPt-1\text{'}+\text{'}MHPt\text{'})/\{4\times(\lambda b-\lambda a-\Sigma \lambda mp)\} \quad (2A)$$

$$L\beta(t)=\lambda a \times \lambda b \times (|\text{'}MHPt-1\text{'}-\text{'}MHPt\text{'}|)/\{4\times(\lambda b-\lambda a-\Sigma \lambda mp)\} \quad (3A)$$

where λmp represents the magnitude of the width of frequencies made discontinuous by the mode hopping phenomenon (FIG. 22). If a plurality of mode hopping phenomena occur in one period t, the magnitudes λmp exhibit almost the same magnitude. Σλmp represents the value obtained by adding all the magnitudes λmp of the widths of frequencies made discontinuous by the mode hopping phenomena which have occurred in one period t.

The candidate values La(t) and Va(t) are the values calculated on the assumption that the measurement target 12 is in the micro displacement region, and the candidate values Lβ(t) and Vβ(t) are the values calculated on the assumption that the measurement target 12 is in the normal displacement region. The computing device 9 calculates equations (2) to (5) at every start point of each period shown in FIG. 4.

Subsequently, the distance subtraction calculating unit 92 of the computing device 9 calculates distance subtractions as the differences between distance candidate values at current time t and distance candidate values at time (t−1) one period before the current time, which are stored in the storage unit 93, in both the micro displacement region and the normal displacement region according to the following equations, and stores them in the storage unit 93 (step S2 in FIG. 6):

$$Vcala(t)=La(t)-La(t-1) \quad (6)$$

$$Vcal\beta(t)=L\beta(t)-L\beta(t-1) \quad (7)$$

The distance subtraction Vcala(t) is the value calculated on the assumption that the measurement target 12 is in the micro displacement region, and the distance subtraction Vcalβ(t) is the value calculated on the assumption that the measurement target 12 is in the normal displacement region. The computing device 9 calculates equations (6) and (7) at every start time t. Note that in equations (4) to (7), the direction in which the measurement target 12 approaches the range finder/velocimeter of this embodiment is defined as a positive direction, and the direction in which the measurement target 12 moves away from the meter is defined as a negative direction.

The state determination unit 94 of the computing device 9 determines the state of the measurement target 12 by using the calculation results from equations (2) to (7) stored in the storage unit 93 (step S3 in FIG. 6).

Figure 7:
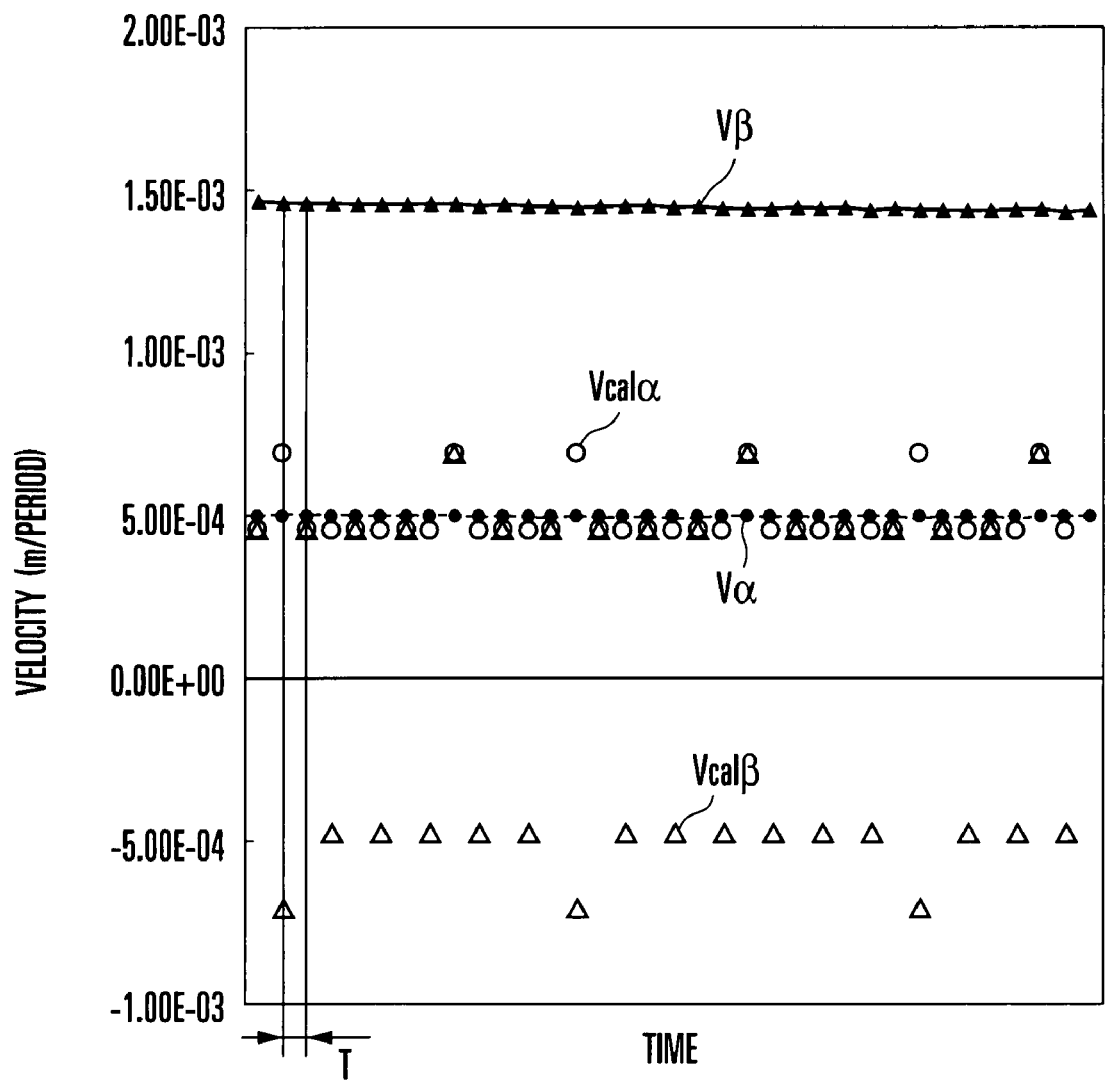
FIG. 7 is a graph showing an example of velocity candidate values and distance subtractions when a measurement target is moving (in uniform motion) in a micro displacement region in the embodiment of the present invention.

FIG. 7 shows an example of the velocity candidate values Va(t) and Vβ(t) and the distance subtractions Vcala(t) and Vcalβ(t) when the measurement target 12 is moving (in uniform motion) in the micro displacement region. The symbols ●, ▲, ○, and Δ respectively represent Va(t), Vβ(t), Vcala(t), and Vcalβ (ditto for FIGS. 8 to 12). In the case shown in FIG. 7, the velocity of the measurement target 12 is 0.0005 m/period, the shortest Lasing wavelength λa of the semiconductor laser 1 is 680 nm, and the longest Lasing wavelength λb is 681 nm. As is obvious from FIG. 7, when the measurement target 12 moves (in uniform motion) in the micro displacement region, the sign of the distance subtraction Vcala(t) calculated on the assumption that the measurement target 12 is in the micro displacement region is constant (positive in the case shown in FIG. 7), and the velocity candidate value Va(t) calculated on the assumption the measurement target 12 is in the micro displacement region is equal to the absolute average value of the distance subtraction Vcala(t). In contrast, the sign of the distance subtraction Vcalβ(t) calculated on the assumption that the measurement target 12 is in the normal displacement region is inverted at every start time t. That is, the sign of the distance subtraction in the first oscillation period differs from that in the second oscillation period.

The state determination unit 94 determines that the measurement target 12 is moving (in uniform motion) in the micro displacement region, if the sign of the distance subtraction Vcala(t) calculated on the assumption that the measurement target 12 is in the micro displacement region is constant, and the velocity candidate value Va(t) calculated on the assumption that the measurement target 12 is in the micro displacement region is equal to the absolute average value of the distance subtraction Vcala(t).

FIG. 8 shows an example of the velocity candidate values Va(t) and Vβ(t) and the distance subtractions Vcala(t) and Vcalβ(t) when the measurement target 12 is moving (in uniform motion) in the normal displacement region. In the example shown in FIG. 8, the velocity of the measurement target 12 is 0.002 m/period, the shortest Lasing wavelength λa of the semiconductor laser 1 is 680 nm, and the longest Lasing wavelength λb is 681 nm. As is obvious from FIG. 8, when the measurement target 12 is moving (in uniform motion) in the normal displacement region, the sign of the distance subtraction Vcalβ(t) calculated on the assumption that the measurement target 12 is in the normal displacement region is constant (positive in the example in FIG. 8), and the velocity candidate value Vβ(t) calculated on the assumption that the measurement target 12 is in the normal displacement region is equal to the absolute average value of the distance subtraction Vcalβ(t). In contrast, the sign of the distance subtraction Vcala(t) calculated on the assumption that the measurement target 12 is in the micro displacement region is inverted at every start time t.

The state determination unit 94 therefore determines that the measurement target 12 is moving (in uniform motion) in the normal displacement region, if the sign of the distance subtraction Vcalβ(t) calculated on the assumption that the measurement target 12 is in the normal displacement region is constant, and the velocity candidate value Vβ(t) calculated on the assumption that the measurement target 12 is in the normal displacement region is equal to the absolute average value of the distance subtraction Vcalβ(t).

Figure 9:
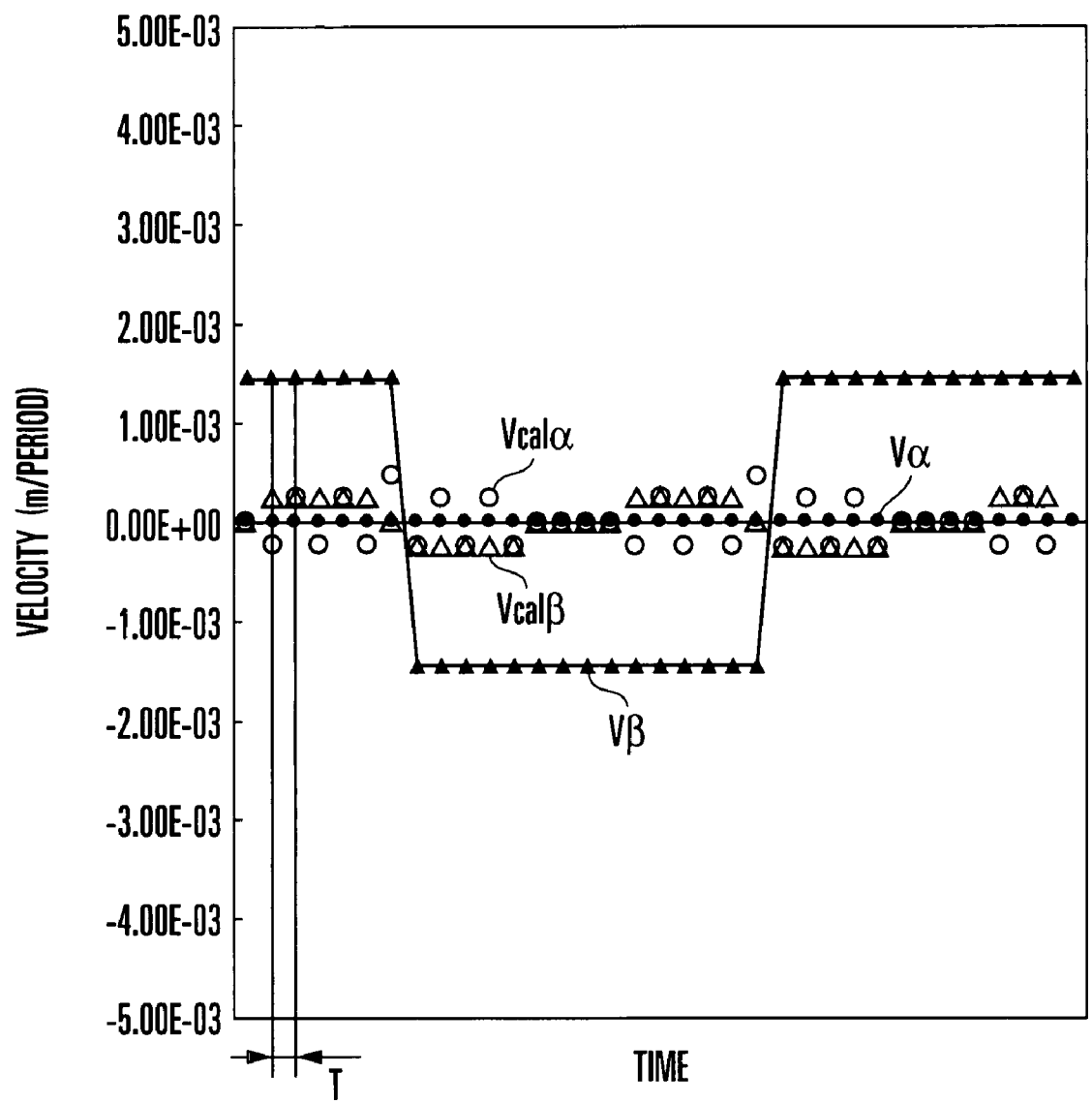
FIG. 9 is a graph showing an example of velocity candidate values and distance subtractions when the measurement target is vibrating (in accelerated motion) in the micro displacement region in the embodiment of the present invention.

FIG. 9 shows an example of the velocity candidate values Va(t) and Vβ(t) and the distance subtractions Vcala(t) and Vcalβ(t) when the measurement target 12 is vibrating (in accelerated motion) about a predetermined position in the micro displacement region. In the example shown in FIG. 9, the maximum speed of the measurement target 12 is 0.000002 m/period, the shortest Lasing wavelength λa of the semiconductor laser 1 is 680 nm, and the longest Lasing wavelength λb is 681 nm. As is obvious from FIG. 9, when the measurement target 12 is vibrating (in accelerated motion), the velocity candidate value Va(t) calculated on the assumption that the measurement target 12 is in the micro displacement region does not coincide with the absolute average value of the distance subtraction Vcala(t) calculated on the assumption that the measurement target 12 is in the micro displacement region. Likewise, the velocity candidate value Vβ(t) calculated on the assumption that the measurement target 12 is in the normal displacement region does not coincide with the absolute average value of the distance subtraction Vcalβ(t) calculated on the assumption that the measurement target 12 is in the normal displacement region.

Figure 10:
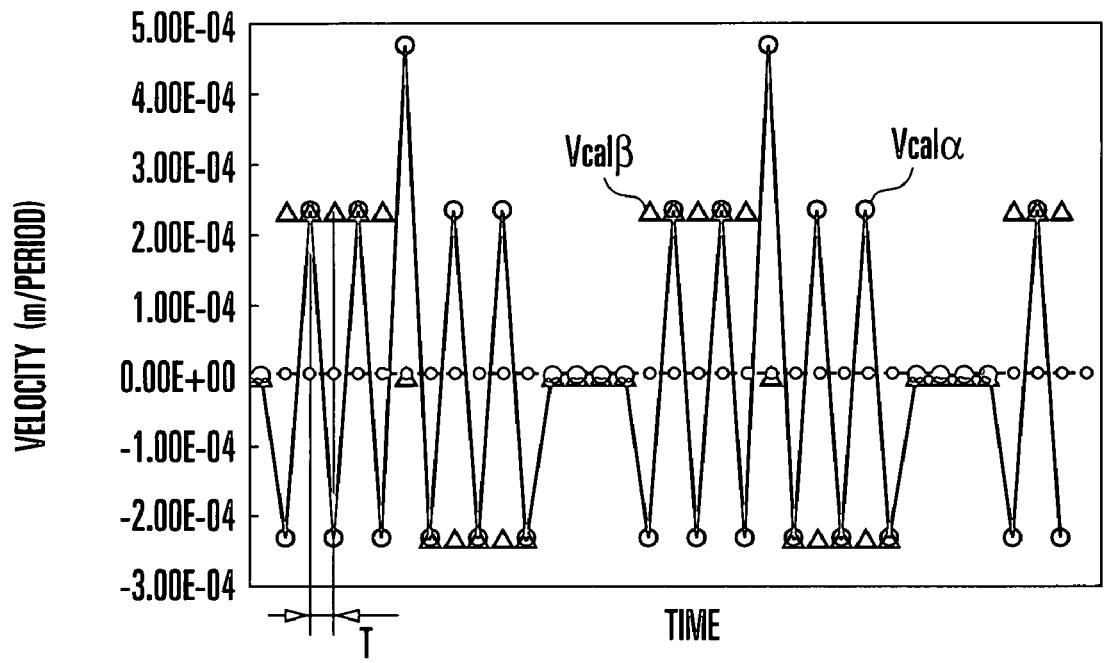
FIG. 10 is an enlarged graph showing part of FIG. 9.

FIG. 10 is an enlarged view of a portion near a velocity of 0 in FIG. 9. As is obvious from FIG. 10, the sign of the distance subtraction Vcala(t) calculated on the assumption that the measurement target 12 is in the micro displacement region is inverted at every start time t, and the sign of the distance subtraction Vcalβ(t) calculated on the assumption that the measurement target 12 is in the normal displacement region does not vary at every start time t even though it may vary at other time points.

The state determination unit 94 therefore determines that the measurement target 12 is vibrating (in accelerated motion) in the micro displacement region, if the sign of the distance subtraction Vcala(t) calculated on the assumption that the measurement target 12 is in the micro displacement region is inverted at every start time t, and the velocity candidate value Va(t) calculated on the assumption that the measurement target 12 is in the micro displacement region does not coincide with the absolute average value of the distance subtraction Vcala(t).

Consider the velocity candidate value Vβ(t) shown in FIG. 9. The absolute value of Vβ(t) is a constant and equal to a wavelength change rate (λb−λa)/λb of the semiconductor laser 1. The state determination unit 94 therefore may determine that the measurement target 12 is vibrating (in accelerated motion) in the micro displacement region, if the absolute value of the velocity candidate value Vβ(t) calculated on the assumption that the measurement target 12 is in the normal displacement region is equal to the wavelength change rate, and the velocity candidate value Va(t) calculated on the assumption that the measurement target 12 is in the micro displacement region does not coincide with the absolute average value of the distance subtraction Vcala(t).

Figure 11:
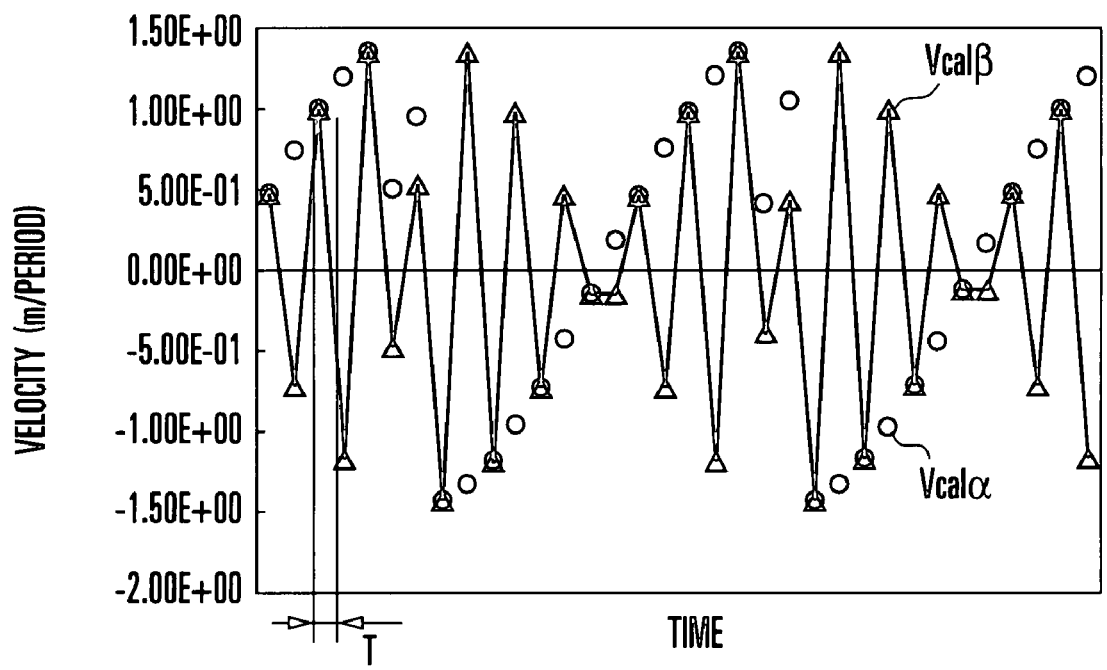
FIG. 11 is a graph showing an example of distance subtractions when the measurement target is vibrating (in accelerated motion) in the normal displacement region in the embodiment of the present invention.

FIG. 11 shows an example of the distance subtractions Vcala(t) and Vcalβ(t) when the measurement target 12 is vibrating (in accelerated motion) about a predetermined position in the normal displacement region. In the example shown in FIG. 11, the maximum speed of the measurement target 12 is 0.01 m/period, the shortest Lasing wavelength λa of the semiconductor laser 1 is 680 nm, and the longest Lasing wavelength b is 681 nm. FIG. 11 shows no information about the velocity candidate values Va(t) and Vβ(t) because they are small.

Although not explicitly shown in FIG. 11, as in the case shown in FIG. 9, the velocity candidate value Va(t) calculated on the assumption that the measurement target 12 is in the micro displacement region does not coincide with the absolute average value of the distance subtraction Vcala(t) calculated on the assumption that the measurement target 12 is in the micro displacement region, and the velocity candidate value Vβ(t) calculated on the assumption that the measurement target 12 is in the normal displacement region does not coincide with the absolute average value of the distance subtraction Vcalβ(t) calculated on the assumption that the measurement target 12 is in the normal displacement region.

ated motion) in the normal displacement region, if the absolute value of the velocity candidate value Va(t) calculated on the assumption that the measurement target 12 is in the micro displacement region is equal to the wavelength change rate, and the velocity candidate value Vβ(t) calculated on the assumption that the measurement target 12 is in the normal displacement region does not coincide with the absolute average value of the distance subtraction Vcalβ(t). Table 1 shows the above determining operation of the state determination unit 94.

TABLE 1

|  |  | Distance subtraction | | Velocity Candidate Value | |
| --- | --- | --- | --- | --- | --- |
|  |  | Vcala(t) | Vcalβ(t) | Va(t) | Vβ(t) |
| Uniform motion | Micro displacement region | sign is constant velocity candidate value coincides with absolute average value of distance subtraction | inverted at every sign period | — | — |
|  | Normal displacement region | inverted at every sign period | sign is constant velocity candidate value coincides with absolute average value of distance subtraction | — | — |
| Accelerated motion | Micro displacement region | inverted at every sign period velocity candidate value does not coincide with absolute average value of distance subtraction | — | — | absolute velocity candidate value coincides with wavelength change rate |
|  | Normal displacement region | — | inverted at every sign period velocity candidate value does not coincide with absolute average value of distance subtraction | absolute velocity candidate value coincides with wavelength change rate |  |

As is obvious from FIG. 11, the sign of the distance subtraction Vcalβ(t) calculated on the assumption that the measurement target 12 is in the normal displacement region is inverted at every start time t, and the sign of the distance subtraction Vcala(t) calculated on the assumption that the measurement target 12 is in the micro displacement region does not vary at every start time t even though it may vary at other time points.

The state determination unit 94 therefore determines that the measurement target 12 is vibrating (in accelerated motion) in the normal displacement region, if the sign of the distance subtraction Vcalβ(t) calculated on the assumption that the measurement target 12 is in the normal displacement region is inverted at every start time t, and the velocity candidate value Vβ(t) calculated on the assumption that the measurement target 12 is in the normal displacement region does not coincide with the absolute average value of the distance subtraction Vcalβ(t).

Figure 12:
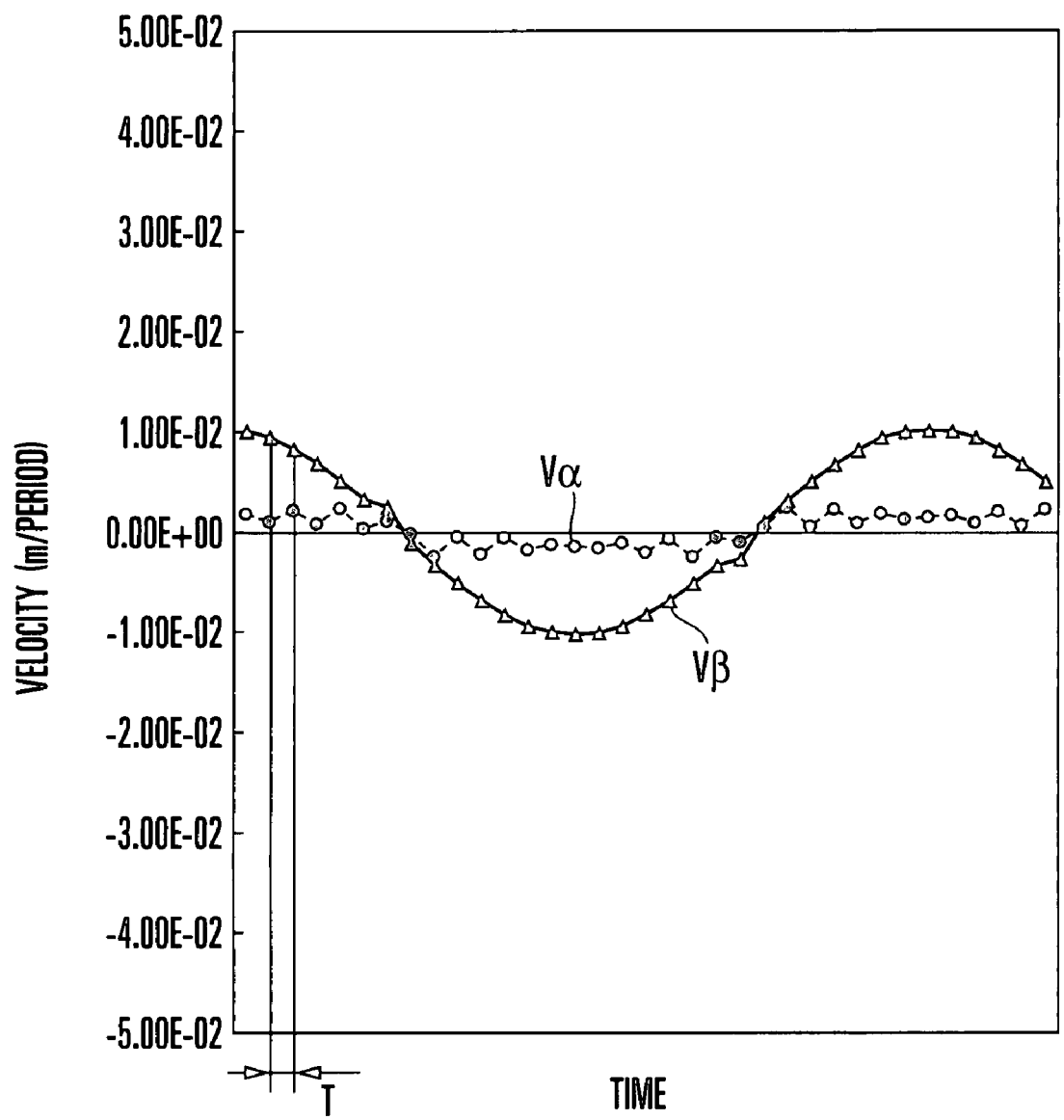
FIG. 12 is an enlarged graph showing part of FIG. 11.

FIG. 12 is an enlarged view of a portion near a velocity of 0 in FIG. 11. Consider the velocity candidate value Va(t). In this case, the absolute value of Va(t) is a constant and equal to the wavelength change rate $(\lambda b-\lambda a)/\lambda b$ of the semiconductor laser 1. The state determination unit 94 therefore may determine that the measurement target 12 is vibrating (in acceler- The distance/velocity confirming unit 95 of the computing device 9 confirms the velocity of the measurement target 12 and the distance to the measurement target 12 on the basis of the determination result obtained by the state determination unit 94 (step S4 in FIG. 6).

That is, if it is determined that the measurement target 12 is moving (in uniform motion) in the micro displacement region, the distance/velocity confirming unit 95 confirms that the velocity candidate value Va(t) is the velocity of the measurement target 12, and the distance candidate value La(t) is the distance to the measurement target 12. If it is determined that the measurement target 12 is moving (in uniform motion) in the normal displacement region, the distance/velocity confirming unit 95 confirms that the velocity candidate value Vβ(t) is the velocity of the measurement target 12, and the distance candidate value Lβ(t) is the distance to the measurement target 12.

In addition, if it is determined that the measurement target 12 is vibrating (in accelerated motion) in the micro displacement region, the distance/velocity confirming unit 95 confirms that the velocity candidate value Va(t) is the velocity of the measurement target 12, and the distance candidate value La(t) is the distance to the measurement target 12. If it is determined that the measurement target 12 is vibrating (in accelerated motion) in the normal displacement region, the distance/velocity confirming unit 95 confirms that the velocity candidate value Vβ(t) is the velocity of the measurement target 12, and the distance candidate value Lβ(t) is the distance to the measurement target 12. Note that if the measurement target 12 is vibrating (in accelerated motion), the actual distance is the average value of the distances Lβ(t).

The computing device 9 performs the above processing in steps S1 to S4 at every start time t until, for example, the user issues an instruction to finish measurement (YES in step S5).

The display device 10 displays the velocity of the measurement target 12 and the distance to the measurement target 12 which are calculated by the computing device 9.

As described above, in this embodiment, the semiconductor laser 1 is made to alternately repeat the first oscillation period t−1 of continuously increasing the oscillation wavelength of the semiconductor laser 1 and the second oscillation period t of continuously decreasing the oscillation wavelength, and the number of MHPs contained in an output signal from this photodiode is counted in each of the first oscillation period t−1 and the second oscillation period t. The embodiment then can calculate the distance to the measurement target 12 and the velocity of the measurement target 12 from the shortest Lasing wavelength λa and the longest Lasing wavelength λb of the semiconductor laser 1. As a result, this embodiment can measure not only the distance to the measurement target 12 but also the velocity of the measurement target 12 while making the most of the advantages of a conventional self-mixing/self-coupling type laser measurement instrument, i.e., (a) capability of downsizing the apparatus, (b) unnecessity of a high-speed circuit, (c) robustness against disturbance light, and (d) capability of being applied to any type of measurement target. In addition, this embodiment can determine whether the measurement target 12 is in uniform motion or accelerated motion.

As obvious from FIG. 7, when the measurement target 12 is moving (in uniform motion) in the micro displacement region, both the velocity of the measurement target 12 and the measured velocity Va(t) are 0.0005 m/period. That is, the velocimetry result coincides with the true value. FIG. 13 shows distances La(t) measured in the case shown in FIG. 7 and the true values. The symbols ● and ○ respectively represent the distances La(t) and the true values of the distances. As is obvious from FIG. 13, the range-finding results coincide with the true values.

As is obvious from FIG. 8, when the measurement target 12 is moving (in uniform motion) in the normal displacement region, both the velocity of the measurement target 12 and the measured velocity Vβ(t) are 0.002 m/period. That is, the velocimetry result coincides with the true value. FIG. 14 shows the measured distances Lβ(t) measured in the case shown in FIG. 8 and the true values of the distances. The symbols ● and ○ respectively represent the distances Lβ(t) and the true values of the distances. As is obvious from FIG. 14, the range-finding results coincide with the true values.

Figure 15:
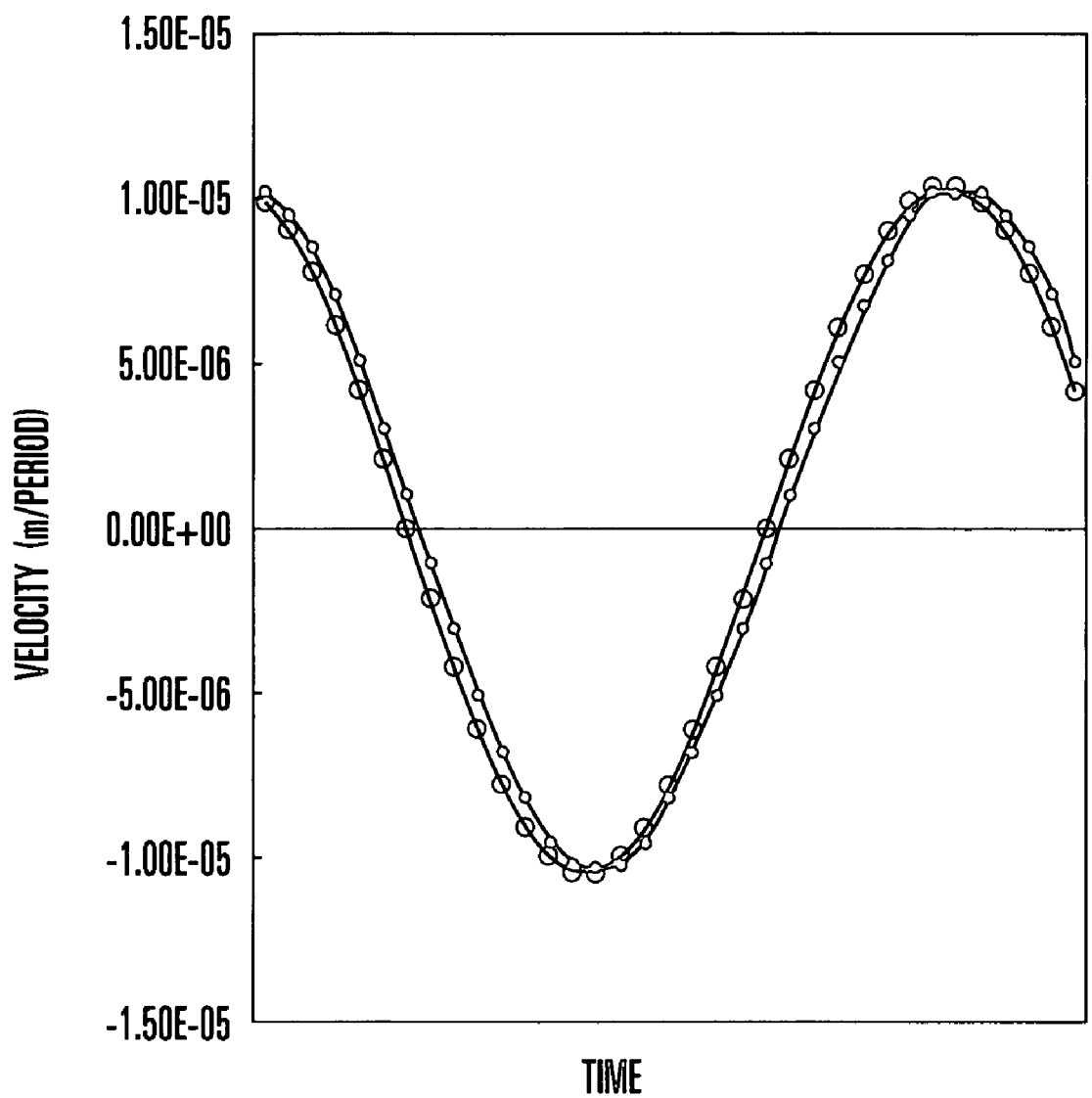
FIG. 15 is a graph showing velocities measured when the measurement target is vibrating (in accelerated motion) in the micro displacement region and the true values of the velocities in the embodiment of the present invention.

FIG. 15 shows velocities Va(t) measured in the case shown in FIG. 9 and the true values of the velocities when the measurement target 12 is vibrating (in accelerated motion) in the micro displacement region. FIG. 16 shows measured distances La(t) in the case shown in FIG. 9, the average values of the distances La(t), and the true values of the distances. Referring to FIG. 15, the symbols ● and ○ respectively represent the velocities Va(t) and the true values of the velocities. Referring to FIG. 16, the symbols ●, −, and ○ respectively represent the distances La(t), the average values of the distances La(t), and the true values of the distances. As is obvious from FIGS. 15 and 16, the velocimetry results coincide with the true values, and the distances and the measurement results on the average values of the distances coincide with the true values.

Figure 18:
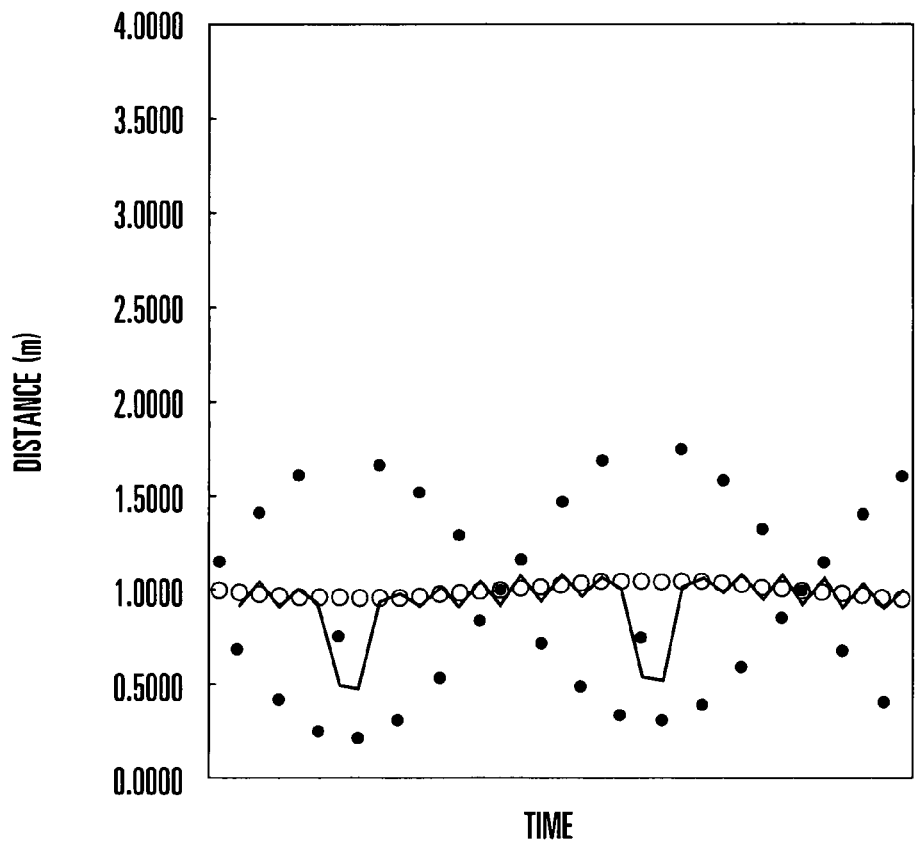
FIG. 18 is a graph showing distances measured when the measurement target is vibrating (in accelerated motion) in the normal displacement region, the average values of the distances, and the true values of the distances in the embodiment of the present invention.

FIG. 17 shows velocities Vβ(t) measured in the case shown in FIG. 11 and the true values of the velocities when the measurement target 12 is vibrating (in accelerated motion) in the normal displacement region. FIG. 18 shows distances Lβ(t) measured in the case shown in FIG. 11, the average values of the distances Lβ(t), and the true values of the distances. Referring to FIG. 17, the symbols ● and ○ respectively represent the velocities Vβ(t) and the true values of the velocities. Referring to FIG. 18, the symbols ●, −, and ○ respectively represent the distances Lβ(t), the average values of the distances Lβ(t), and the true values of the distances. As is obvious from FIGS. 17 and 18, the velocimetry results coincide with the true values, and the measurement results on the average values of the distances coincide with the true values.

This embodiment has exemplified the case wherein the counting unit 13 counts the numbers of MHPs throughout the first and second oscillation periods. However, it suffices to count the number of MHPs in part of each oscillation period. In this case, the computing device 9 calculates the distance to the measurement target 12 and the velocity of the measurement target 12 by using the shortest Lasing wavelength and the longest Lasing wavelength in a period during which the counting unit 13 counts the number of MHPs.

In addition, the computing device 9 in this embodiment can be implemented by, for example, a computer comprising a CPU, storage device, and interface, and programs for controlling these hardware resources. The programs for causing such a computer to operate as the computing device 9 are provided while being recorded on a recording medium such as a flexible disk, CD-ROM, DVD-ROM, or memory card. The CPU writes read programs in the storage device and executes the processing described in this embodiment in accordance with the programs. In addition, the display device 10 simultaneously displays the distance (displacement) to a measurement target and the velocity of the measurement target in real time.

Figure 19:
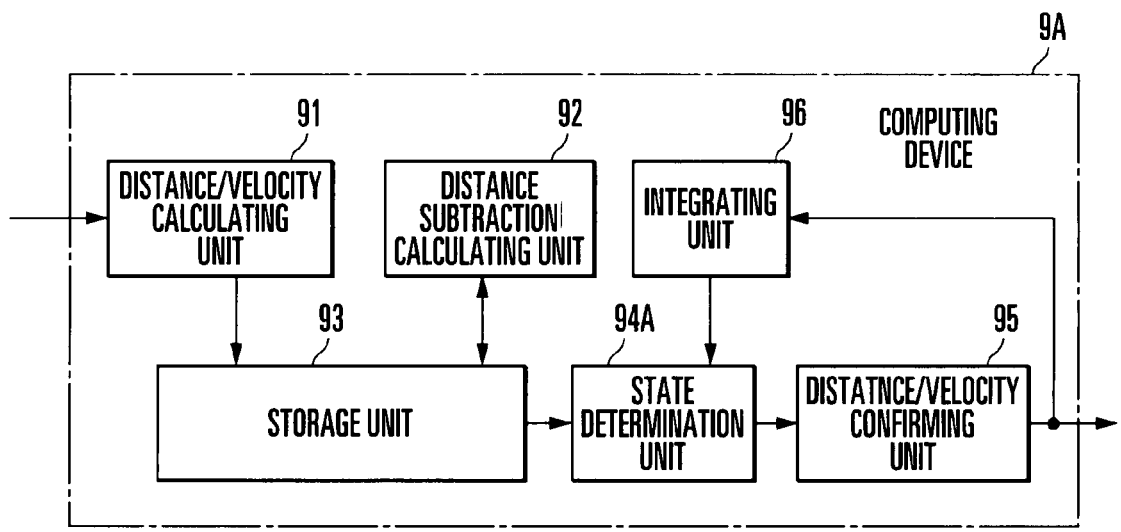
FIG. 19 is a block diagram showing another example of the arrangement of the computing device in the embodiment of the present invention.
Figure 20:
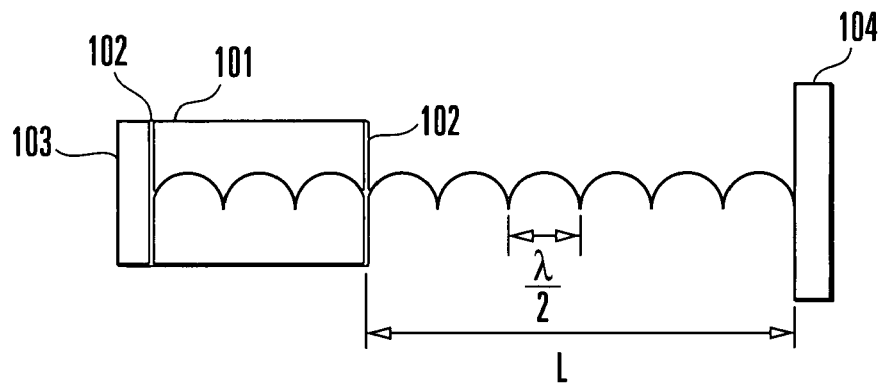
FIG. 20 is a graph showing a semiconductor laser of a complex resonator model in a conventional laser measurement instrument.
Figure 21:
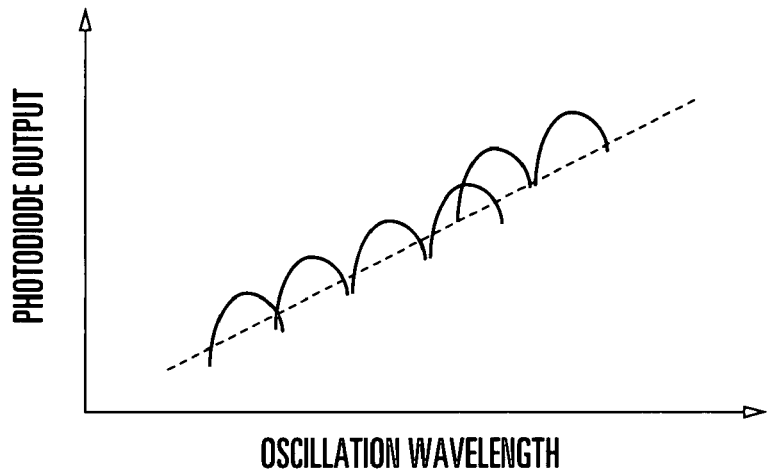
FIG. 21 is a graph showing the relationship between the oscillation wavelength of a semiconductor laser and the output waveform of a built-in photodiode.

When the measurement target 12 is vibrating (at, for example, a maximum speed of 2 nm) with a very small displacement, an actual change (amplitude) in distance is several nm. However, since the resolution (distance resolution) of distance calculation is lower than the displacement resolution, a large error occurs. More specifically, when the displacement is smaller than the distance resolution, a distance value changes by some resolution levels in accordance with a slight displacement even though the calculated distance should not change. For this reason, if the displacement is smaller than the distance resolution, it is necessary to prevent a change in distance value. For this reason, it suffices to use a computing device 9A shown in FIG. 19.

In the computing device 9A, if the velocity confirmed by the distance/velocity confirming unit 95 is lower than a predetermined reference value, an integrating unit 96 calculates the integral (displacement) of the velocity. A state determination unit 94A compares the calculated displacement with the distance resolution. If the displacement is smaller than the distance resolution, the state determination unit 94A determines that the change in distance is smaller than the resolution. The state determination unit 94A then determines that the final distance has not changed, i.e., the change amount of distance is zero.

INDUSTRIAL APPLICABILITY

The present invention can be applied to the technique of measuring the distance to a measurement target and the velocity of the measurement target.

The invention claimed is:

1. A range finder/velocimeter characterized by comprising:
   a semiconductor laser which emits laser light to a measurement target;
   a laser driver which causes said semiconductor laser to operate such that a first oscillation period including at least a period of continuously and monotonically increasing an oscillation wavelength and a second oscillation period including at least a period of continuously and monotonically decreasing the oscillation wavelength alternately exist for at least two periods;
   a light-receiving device which converts laser light emitted from said semiconductor laser and return light from the measurement target into electrical signals;
   counting means for counting the number of interference waveform components caused by laser light emitted from said semiconductor laser and return light from the measurement target which are contained in an output signal from said light-receiving device in at least part of each of the first oscillation period and the second oscillation period; and
   computing means for calculating a distance to the measurement target and a velocity of the measurement target from a shortest Lasing wavelength and a longest Lasing wavelength in a period during which the number of interference waveform components is counted by said counting means and a counting result obtained by said counting means.

2. A range finder/velocimeter according to claim 1, characterized in that said counting means counts the number of interference waveform components caused by a self-mixing effect/self-coupling effect between laser light emitted from said semiconductor laser and return light from the measurement target.

3. A range finder/velocimeter according to claim 1, characterized in that said computing means uses a shortest Lasing wavelength and a longest Lasing wavelength in each oscillation period of said semiconductor laser as a shortest Lasing wavelength and a longest Lasing wavelength in a period during which said counting means counts the number of interference waveform components.

4. A range finder/velocimeter according to claim 3, characterized in that said computing means comprises
   a distance/velocity calculating unit which calculates a candidate value of a distance to the measurement target and a candidate value of a velocity of the measurement target on the basis of a shortest Lasing wavelength and a longest Lasing wavelength of said semiconductor laser and a counting result obtained by said counting means,
   a distance subtraction calculating unit which calculates a distance subtraction as a difference between the distance candidate value calculated by said distance/velocity calculating unit and a previously calculated distance candidate value;
   a state determination unit which determines a state of the measurement target on the basis of calculation results obtained by said distance/velocity calculating unit and said distance subtraction calculating unit, and
   a distance/velocity confirming unit which confirms a distance to the measurement target and a velocity of the measurement target on the basis of a determination result obtained by said state determination unit.

5. A range finder/velocimeter according to claim 4, characterized in that
   said distance/velocity calculating unit and said distance subtraction calculating unit calculate a distance candidate value, a velocity candidate value, and a distance subtraction for each period as a sum of the first oscillation period and the second oscillation period in each of a case in which the measurement target is in a micro displacement region in which movement of the measurement target is smaller than a reference and a case in which the measurement target is in a normal displacement region in which the movement is larger than the reference, upon regarding the state of the measurement target as one of the micro displacement region and the normal displacement region, and
   said state determination unit determines whether the measurement target is in the micro displacement region or the normal displacement region and whether the measurement target is in uniform motion or accelerated motion, on the basis of calculation results obtained by said distance/velocity calculating unit and said distance subtraction calculating unit, for each calculation by said distance/velocity calculating unit and said distance subtraction calculating unit.

6. A range finder/velocimeter according to claim 5, characterized in that
   said state determination unit determines that the measurement target is in uniform motion in the micro displacement region, when a sign of a distance subtraction calculated on the assumption that the measurement target is in the micro displacement region is constant, and a velocity candidate value calculated on the assumption that the measurement target is in the micro displacement region is equal to an absolute average value of distance subtractions calculated on the assumption that the measurement target is in the micro displacement region.

7. A range finder/velocimeter according to claim 5, characterized in that
   said state determination unit determines that the measurement target is in uniform motion in the normal displacement region, when a sign of a distance subtraction calculated on the assumption that the measurement target is in the normal displacement region is constant, and a velocity candidate value calculated on the assumption that the measurement target is in the normal displacement region is equal to an absolute average value of distance subtractions calculated on the assumption that the measurement target is in the normal displacement region.

8. A range finder/velocimeter according to claim 5, characterized in that
   said state determination unit determines that the measurement target is in accelerated motion in the micro displacement region, when a sign of a distance subtraction calculated on the assumption that the measurement target is in the micro displacement region is inverted for each calculation, and a velocity candidate value calculated on the assumption that the measurement target is in the micro displacement region does not coincide with an absolute average value of distance subtractions calculated on the assumption that the measurement target is in the micro displacement region.

9. A range finder/velocimeter according to claim 5, characterized in that said state determination unit determines that the measurement target is in accelerated motion in the micro displacement region, when an absolute value of a velocity candidate value calculated on the assumption that the measurement target is in the normal displacement region is equal to a wavelength change rate of said semiconductor laser, and a velocity candidate value calculated on the assumption that the measurement target is in the micro displacement region does not coincide with an absolute average value of distance subtractions calculated on the assumption that the measurement target is in the micro displacement region.

10. A range finder/velocimeter according to claim 5, characterized in that
said state determination unit determines that the measurement target is in accelerated motion in the normal displacement region, when a sign of a distance subtraction calculated on the assumption that the measurement target is in the normal displacement region is inverted for each calculation, and a velocity candidate value calculated on the assumption that the measurement target is in the normal displacement region does not coincide with an absolute average value of distance subtractions calculated on the assumption that the measurement target is in the normal displacement region.

11. A range finder/velocimeter according to claim 5, characterized in that said state determination unit determines that the measurement target is in accelerated motion in the normal displacement region, when an absolute value of a velocity candidate value calculated on the assumption that the measurement target is in the micro displacement region is equal to a wavelength change rate of said semiconductor laser, and a velocity candidate value calculated on the assumption that the measurement target is in the normal displacement region does not coincide with an absolute average value of distance subtractions calculated on the assumption that the measurement target is in the normal displacement region.

12. A range finder/velocimeter according to claim 4, characterized by further comprising an integrating unit which calculates an integral of a velocity confirmed by said distance/velocity confirming unit when the velocity is lower than a reference value,
wherein said state determination unit sets a distance change amount to zero when the integral calculated by said integrating unit is smaller than a distance calculation resolution.

13. A range-finding/velocimetry method comprising the steps of:
applying a wavelength-modulated wave to a measurement target;
detecting interference caused between the applied wave and a return wave reflected by the measurement target; and
calculating a distance to the measurement target and a velocity of the measurement target on the basis of information associated with the detected interference, wherein
the step comprises the step of causing a semiconductor laser to operate such that a first oscillation period including at least a period of continuously and monotonically increasing an oscillation wavelength and a second oscillation period including at least a period of continuously and monotonically decreasing the oscillation wavelength alternately exist for at least two periods,
the step or detecting comprises the steps of
converting laser light emitted from the semiconductor laser and return light from the measurement target into electrical signals by using a light-receiving device, and
counting the number of interference waveform components produced by a self-mixing effect/self-coupling effect between laser light emitted from the semiconductor laser and return light from the measurement target which are contained in an output signal from the light-receiving device in at least part of each of a first oscillation period and a second oscillation operation, and
the step of calculating comprises the step of computing a distance to the measurement target and a velocity of the measurement target from a shortest Lasing wavelength and a longest Lasing wavelength in a period during which interference waveform components are counted, and the number of counted interference waveform components.

14. A range-finding/velocimetry method according to claim 13, characterized in that the step of calculating comprises the steps of
calculating a distance to the measurement target and a velocity of the measurement target on the basis of information associated with the detected interference, and
selecting one distance value and one velocity value from calculated candidate values.

15. A range-finding/velocimetry method according to claim 13, wherein
the step of calculating further comprises the steps of
calculating an integral of the velocity when a calculated velocity is lower than a predetermined reference value, and
setting a distance change amount to zero when a calculated integral is smaller than a distance calculation resolution.

* * * * *

UNITED STATES PATENT AND TRADEMARK OFFICE
CERTIFICATE OF CORRECTION

PATENT NO.         : 7,911,593 B2
APPLICATION NO.    : 11/919649
DATED              : March 22, 2011
INVENTOR(S)        : Tatsuya Ueno It is certified that error appears in the above-identified patent and that said Letters Patent is hereby corrected as shown below:

In the Claims, Column 18, Claim 13, line 5, please delete "the step comprises" and insert --the step of applying comprises--.

Column 18, Claim 13, line 12, please delete "the step or" and insert --the step of--.

Signed and Sealed this
Nineteenth Day of July, 2011

David J. Kappos
*Director of the United States Patent and Trademark Office*